April 26, 1960
J. V. BLYTH ET AL
2,933,893
REMOVABLE BEARING SUPPORT STRUCTURE
FOR A POWER TURBINE
Filed Dec. 10, 1958
2 Sheets-Sheet 1
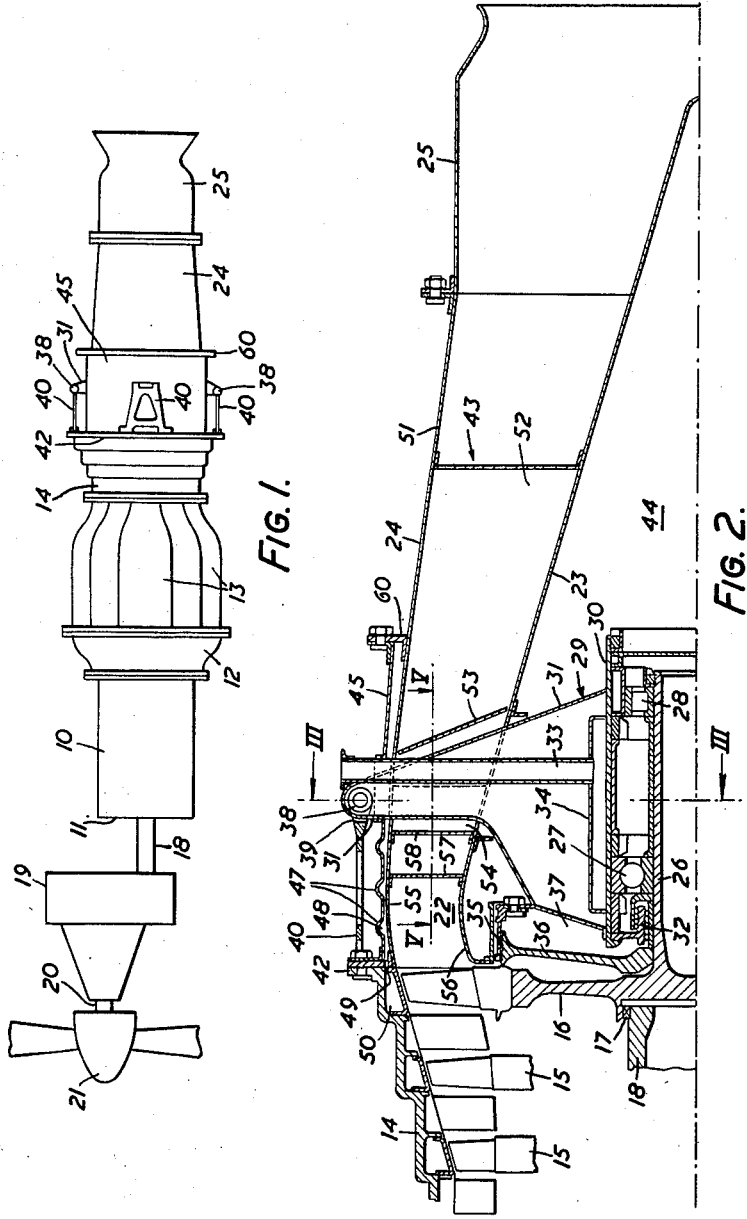
INVENTORS
JACK V. BLYTH
RONALD A. GILBERT
BY
Watson, Cole, Grindle & Watson
ATTORNEY

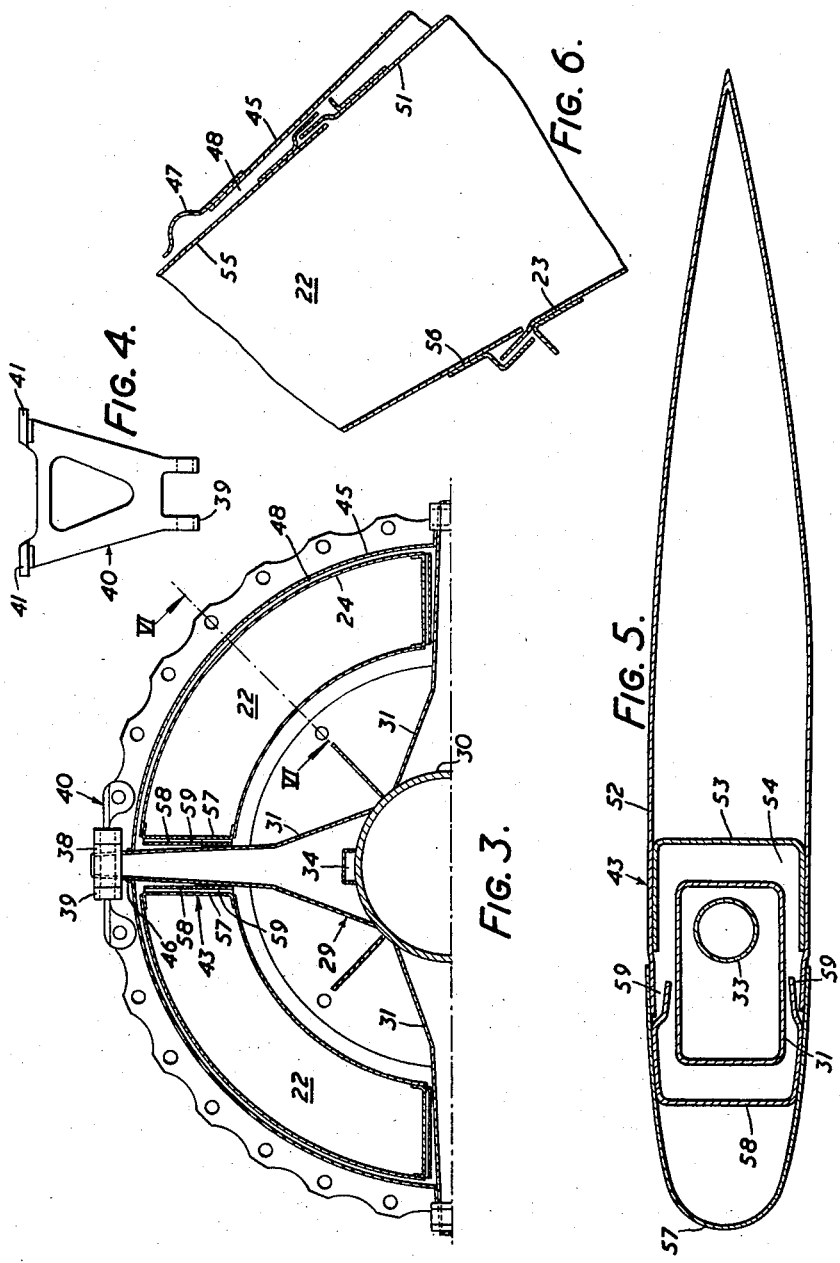

United States Patent Office 2,933,893
Patented Apr. 26, 1960

2,933,893

REMOVABLE BEARING SUPPORT STRUCTURE FOR A POWER TURBINE

Jack Vallis Blyth, Ewell, and Ronald A. Gilbert, North Wembley, England, assignors to D. Napier & Son Limited, London, England, a British company Application December 10, 1958, Serial No. 779,325

Claims priority, application Great Britain December 12, 1957

1 Claim. (Cl. 60—39.16)

This invention relates to combustion turbine power units of the kind comprising an air compressor, a compressor-driving turbine, and a free power turbine downstream of the compressor-driving turbine. The word "free" means that the power turbine is not mechanically coupled to the compressor-driving turbine.

It is known to support the power turbine in a bearing on its upstream side, which bearing is mounted in a disc contained within and supported by a ring of guide blades disposed between the compressor-driving turbine and the power turbine, these guide blades being themselves supported by the turbine casing. Since the said disc may also support the rear bearing of the compressor driving turbine it assures exact alignment of the axes of the two turbines, but this arrangement is not altogether satisfactory as the space available for the power turbine is limited, and lubrication and cooling may present problems in this relatively inaccessible location between the turbines. For reasons of available space and easy accessibility for lubrication and cooling it would be better to dispose the power turbine bearing or bearings on its downstream side, but as guide blades are generally not required downstream of the power turbine the problem arises of how to support such bearing or bearings and ensure exact alignment of the two turbines. It is one object of the present invention to provide a solution to this problem.

According to the present invention, in a combustion turbine power unit of the kind specified the power turbine is supported by at least one bearing on the downstream side, the said bearing being mounted in a cruciform carrier the four radially extending arms of which are connected by links to the turbine casing, which links are rigid in the circumferential direction relative to the turbine casing but are capable of movement in the radial direction.

These links permit irregular radial expansion of the turbine casing while rigidly supporting the said bearing and maintaining exact alignment of the axes of the two turbines. For instance, if a segment of the turbine casing to which one of the said links is connected should expand radially more than the segments to which the other links are connected, the two links disposed at 90° from the first mentioned link will continue to hold the carrier in correct alignment since these links cannot move circumferentially in relation to the turbine casing whereas the first mentioned link is free to move in the radial direction to accommodate the said expansion of the corresponding segment of the turbine casing.

Preferably the cruciform carrier carries two axially spaced bearings which support a stub shaft extending rearwardly from the center of the power turbine disc, so as to provide adequate support for this turbine against tilting.

The power is taken from the power turbine disc by a power transmission shaft which is preferably separate from the said stub shaft.

Axial thrust on the power turbine may be at least partly resisted pneumatically by a balance piston coaxial with the turbine on the downstream side and working in a cylinder which forms part of the cruciform carrier, air at an appropriate pressure being admitted to the cylinder downstream of the piston. The air pressure acting on the piston provides an axial force in the upstream direction which at least partly balances the downstream axial thrust on the power turbine.

The said arms of the cruciform carrier may cross the path of the exhaust gases from the power turbine in streamline casings or spats which traverse an annular exhaust duct, or the exhaust duct may be branched to avoid these arms, or a combination of such expedients may be employed.

Where such spats are provided, extending from a tail pipe cone on the inside to a tail pipe wall at the outside, the outer ends of the arms of the cruciform carrier may project through, and be sealed to a cylidrical sleeve the front and rear ends of which are sealed to the tail pipe wall. In this way the interior of the tail pipe cone is sealed off from the surrounding atmosphere despite the presence of the spats. Such sealing is sometimes desirable, for instance where the interior of the tail pipe cone may be at a slightly different pressure from the surroundings.

In one such form of the invention a rear portion of the tail pipe wall, the tail pipe cone and the rear portions of the spats form a first removable assembly, the cruciform carrier and the cylindrical sleeve forms a second removable assembly, and a front portion of the tail pipe and front portions of the spats form a third removable assembly. In this manner dismantling of the tail pipe and the power turbine mounting to afford access to the power turbine and other parts is facilitated.

The invention may be performed in various ways, and one particular form of power unit embodying the invention will now be described by way of example with reference to the accompanying drawings, in which:

Figure 1 is a side elevation of the power unit;

Figure 2 is a fragmentary sectional elevation on a larger scale showing part of the power turbine, the cruciform carrier and adjacent parts.

Figure 3 is a cross-section taken on the line III—III in Figure 2;

Figure 4 is a plan view of one of the links to which the cruciform carrier is connected, looking in the direction of the arrow IV in Figure 2;

Figure 5 is a sectional view of a spat taken on the line V—V in Figure 2; and

Figure 6 is a sectional view through the annular exhaust duct taken on the line VI—VI in Figure 3.

The combustion turbine power unit shown in the drawings comprises an air compressor 10 having a forwardly-facing air intake 11 and connected at its rear end to a compressed air passage assembly 12. The compressed air which passes through the passage assembly 12 enters a plurality of combustion chambers 13 wherein fuel is burnt and from which hot combustion gases pass into a turbine casing 14. The turbine casing 14 (see Figure 2) contains a two-stage compressor-driving turbine 15 which is connected by a hollow shaft (not shown) to the rotor of the air compressor 10. Downstream of the compressor-driving turbine 15 in the casing 14 there is a free power turbine 16. The power turbine is connected by a toothed or splined connection 17 to a power transmission shaft 18 which extends forwardly through the power unit and at its forward end is connected to a reduction gearing assembly 19 (see Figure 1) the output shaft 20 of this assembly being connected to a variable-pitch propeller 21.

The turbine exhaust passes through an annular exhaust duct 22 bounded on the inside by a tail pipe cone 23 and on the outside by a tail pipe wall 24. Connected to the rear end of the tail pipe wall 24 there is a jet discharge nozzle 25.

The power turbine 16 is provided with a hollow stub shaft 26 formed integrally with the turbine rotor disc and which extends rearwardly. The stub shaft is supported by two axially-spaced bearings 27 and 28 which are themselves mounted in a cruciform carrier 29 comprising a tubular member 30 and four radially-extending arms 31. Various retaining and spacing members are provided within the tubular member 30 to locate the bearings 27 and 28, and an oil seal 32 is provided at the forward end thereof. Oil is admitted to the bearings through an oil supply pipe 33 which leads into a channel 34 and which passes through one of the radial arms 31.

The cruciform carrier 29 also carries a cylinder member 35 in which can slide a balance piston 36 attached to the power turbine 16. Compressed air tapped off from the compressor 10 is admitted through pipes and passages (not shown) to the space 37 within the cylinder 35 on the downstream side of the balance piston 36 to provide a force acting on the power turbine in the forward direction, i.e. to the left in Figure 2, to compensate at least partly for the force exerted on the power turbine in the downstream direction by the gases which impinge upon its blades.

At the outer end of each radial arm 31 there is fixed a cylindrical boss 38. Each such boss is secured by a pin joint to a yoke 39 at one end of a link 40 (see Figure 4). Each link 40 is of A shape, the two feet 41 of each link being secured to a flange 42 at the downstream end of the turbine casing 14. These links are rigid in the circumferential direction in relation to the turbine casing 14 and positively restrain the cruciform carrier against any movement in this direction. On the other hand, the links 40 are relatively thin and consequently are capable of limited flexure in the radial direction. Consequently, inequalities in expansion of the turbine casing 14 can be accommodated without destroying the alignment of the power turbine 16.

The radial arms 31 cross the annular cooling passage 22, and to reduce interference with the gas flow and also to protect the arms themselves from excessive heat, spats 43 are provided in the annular exhaust passage 22. Since there must be some clearance between the arms 31 and the spats to permit differential thermal expansion and to reduce heat flow, difficulties would arise in sealing the space 44 within the tail pipe cone 23 from the surroundings unless special provision were made for this. In certain installations such sealing is desirable, for instance where it is desired that the pressure within the tail pipe cone should differ somewhat from the pressure of the surroundings. In the present embodiment this difficulty is overcome by providing a cylindrical sleeve 45 through which the outer ends of the arms 31 project and to which these arms are welded as by weld seams 46. The front portion of the sleeve 45 is provided with corrugations 47 to facilitate flexing due to thermal expansion of the turbine casing 14. The front end of the sleeve 45 makes sealing engagement with the flange 42, and the rear end with a flange 60 around the tail pipe wall 24. The annular space 48 between the tail pipe wall 24 and the sleeve 45 may be used for cooling purposes, cooling air being admitted to this space through apertures 49 from a cooling air passage 50 within the turbine casing.

In order to facilitate dismantling for affording access to the power turbine and adjacent parts, the parts of the power unit downstream of the power turbine 16 are constructed essentially as three separate removable assemblies. One such assembly comprises a rear portion 51 of the tail pipe wall 24, the tail pipe cone 23, and the rear portion 52 of each of the spats 43, including a wall member 53 which defines the rear part of a chamber 54 around each radial arm 31. If the nozzle 25 is not removed separately, it may form part of this assembly.

The second removable assembly comprises the cruciform carriers complete, i.e. including the bearings 27 and 28, the oil seal 32 and the cylinder 35, the sleeve 45 and the links 40.

The third removable assembly comprises the front portion 55 of the tail pipe wall 24, the inner wall 56 of the annular exhaust duct 22 which adjoins the cone 23, and the front portion 57 of each spat 43. The front portion 57 includes a wall member 58 which forms the front boundary of the chamber 54. As best seen in Figures 3 and 5, the rear edges of the wall member 58 are bent inwardly away from the rear edges of the front portion 57 of the spat to form channels 59 into which fit the front edges of the rear portion 52 of the spat. A similar form of connection is provided between the inner wall 56 of the exhaust duct and the tail pipe cone 23, and between the front portion 55 of the tail pipe wall and the rear portion 51 thereof, as shown in Figure 6.

What we claim as our invention and desire to secure by Letters Patent is:

A tailpipe and power turbine bearing support structure for a combustion turbine power unit, said power unit comprising a turbine casing, a power turbine disposed in said turbine casing, and at least one supporting bearing for said power turbine on the downstream side thereof in the direction of flow of gases through said power turbine, said structure comprising a cruciform carrier for said bearing having four radially-extending arms, four links attached to said turbine casing, means connecting said links to said radially-extending arms, a tailpipe cone, a tailpipe wall, said tailpipe cone and said tailpipe wall bounding an annular exhaust passage extending in said downstream direction from said turbine casing, four streamline spats radially traversing said annular exhaust passage and enclosing said radial arms of said cruciform carrier, a cylindrical sleeve having a front end and a rear end and surrounding said tailpipe wall in spaced relation therewith, means sealingly connecting said front and rear ends of said sleeve to said tailpipe wall, said radial arms penetrating said sleeve, means sealing said radial arms to said sleeve, said tailpipe wall having a front portion and a rear portion separable from said front portion thereof, said spats having front portions and rear portions separable from said front portions thereof, said rear portion of said tailpipe wall, said rear portions of said spats and said tailpipe cone being joined together to form a first unitary assembly removable as a whole from said power unit, said cruciform carrier and said cylindrical sleeve being joined together to form a second unitary assembly removable as a whole from said power unit after removal of said first unitary assembly, and said front portion of said tailpipe wall and said front portions of said spats being joined together to form a third unitary assembly removable as a whole from said power unit after removal of said first and second unitary assemblies.

References Cited in the file of this patent
UNITED STATES PATENTS

| | | |
|---|---|---|
| 2,680,001 | Batt | June 1, 1954 |
| 2,692,724 | McLeod | Oct. 26, 1954 |
| 2,718,350 | Burgess | Sept. 20, 1955 |